United States Patent [19]

Kim

[11] Patent Number: 5,546,898
[45] Date of Patent: Aug. 20, 1996

[54] DEVICE FOR CONTROLLING THE FLOW OF INTAKE AND EXHAUST GASES IN AN INTERNAL COMBUSTION ENGINE

[75] Inventor: Yoonsuk Kim, Kyungki-do, Rep. of Korea

[73] Assignee: Hyundai Motor Company, Rep. of Korea

[21] Appl. No.: 497,600

[22] Filed: Jun. 30, 1995

[30] Foreign Application Priority Data

Jun. 30, 1994 [KR] Rep. of Korea ............... 94-15552

[51] Int. Cl.$^6$ .............................. F02B 75/02; F01L 1/00
[52] U.S. Cl. .......................... 123/90.1; 123/65 PD; 123/65 VD
[58] Field of Search .................. 123/90.1, 90.27, 123/65 PD, 65 VD, 84

[56] References Cited

FOREIGN PATENT DOCUMENTS 136518 8/1984 Japan ................. 123/65 PD
5-9456 3/1993 Japan .

*Primary Examiner*—Weilun Lo
*Attorney, Agent, or Firm*—Finnegan, Henderson, Farabow, Garrett & Dunner

[57] ABSTRACT

Disclosed is a device for controlling the flow of intake and exhaust gases in an internal combustion engine, which comprises a cylinder head with a plurality of cylinders each forming combustion chamber for burning air/fuel mixture to produce a mechanical energy, the combustion chamber having an intake valve for receiving an air/fuel mixture and an exhaust valve for exhausting burnt gases, a blocking means for isolating the side of the intake valve from the side of the exhaust valve so as to prevent a fresh air/fuel mixture and the burnt gases from interfering with each other in the overlap interval between the final stage of the exhaust stroke and the beginning stage of the intake stroke during which the intake and exhaust valves simultaneously maintain the opening state, and a cam shaft for driving the intake and exhaust valves and the blocking means.

10 Claims, 7 Drawing Sheets

DEVICE FOR CONTROLLING THE FLOW OF INTAKE AND EXHAUST GASES IN AN INTERNAL COMBUSTION ENGINE

BACKGROUND OF THE INVENTION

The present invention concerns a device for controlling the flow of intake and exhaust gas in an internal combustion engine.

Figure 10:
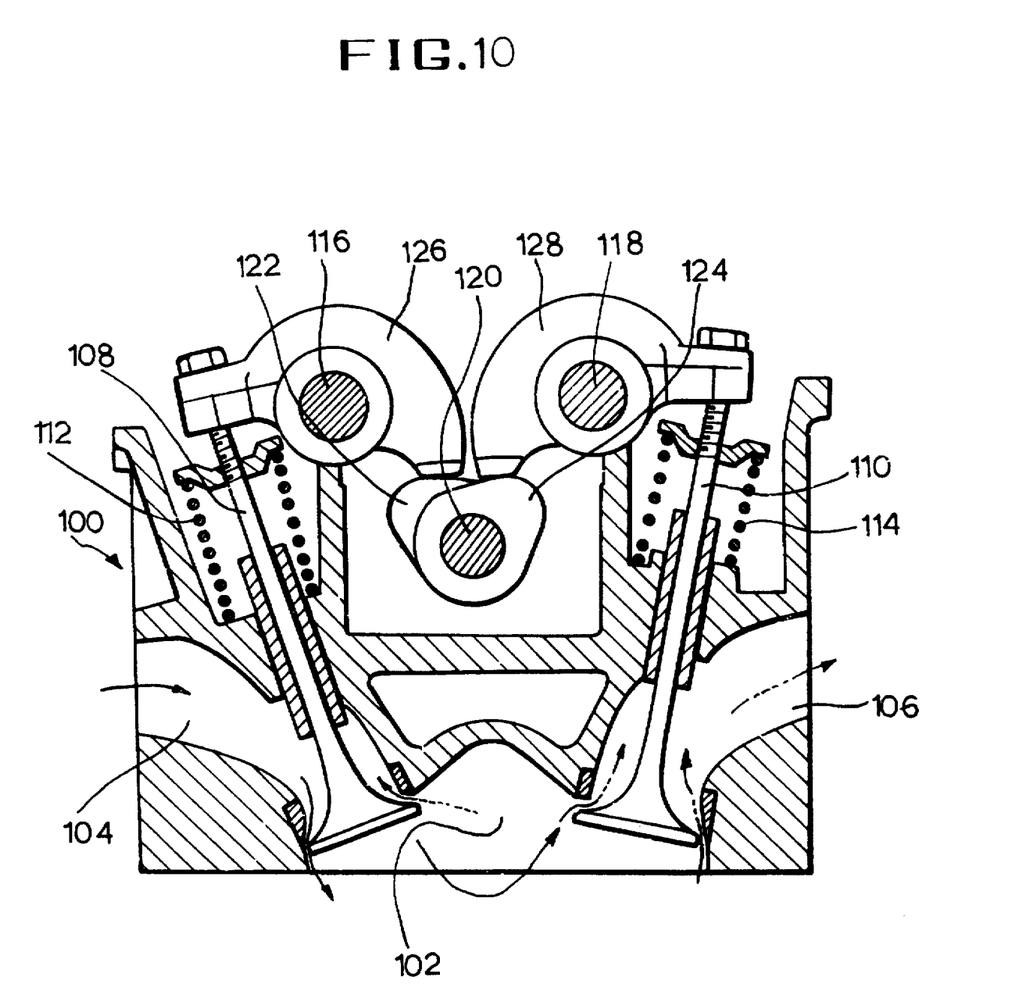
FIG. 10 is a cross sectional view of the cylinder head used in a conventional internal combustion engine.

The internal combustion engine of an automobile comprises a plurality of cylinders each forming combustion chamber for burning air/fuel mixture to produce a mechanical energy, which reciprocates a piston to produce a torque delivered to the drive shaft by means of a crank mechanism. Referring to FIG. 10, there is schematically shown an intake and exhaust valve system provided in a cylinder head 100 whose lower middle part forms a combustion chamber 102 per cylinder. Respectively provided in both sides of the combustion chamber 102 are an intake port 104 for taking in a fresh air/fuel mixture and an exhaust port 106 for exhausting the burnt gases, which are normally closed respectively by means of an intake valve 108 and an exhaust valve 110 pushed by valve springs 112 and 114. When opening the intake or exhaust port 104 or 106, a locker arm 126 or 128 pivots on a shaft 116 or 118 with one end connected to the stem of the intake or exhaust valve 108 or 110 and with the other end moved by the cam surface 122 or 124 of a cam mounted on a cam shaft 120.

Figure 11:
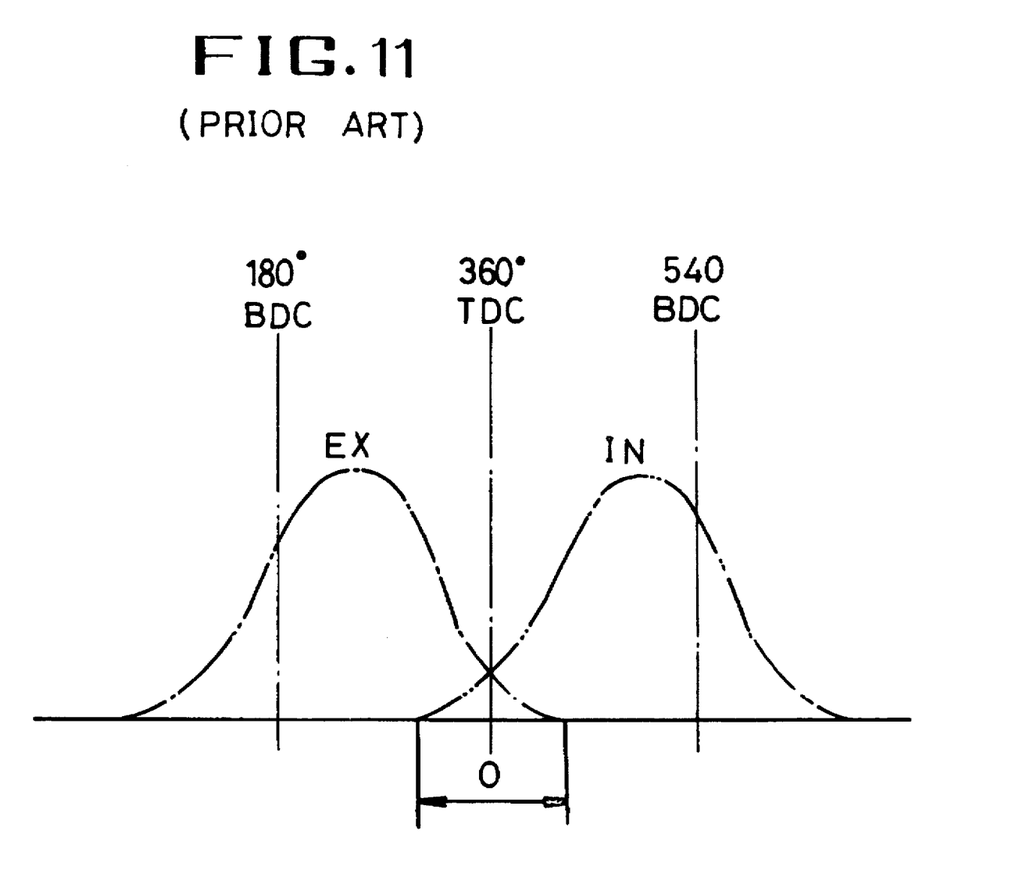
FIG. 11 is a graph for describing the overlap interval for simultaneous opening the intake and exhaust valves.

The intake stroke of the engine opens the intake valve. After the compression and explosion stroke is made with the intake and exhaust valves closed, the exhaust stroke opens the exhaust valve. Generally, it is a common practice to arrange an overlap interval between the final stage of the exhaust stroke and the beginning stage of the intake stroke, during which the intake and exhaust valves simultaneously maintain the opening state in order to improve the intake and exhaust efficiency, as shown in FIG. 11. However, in this case, because the fresh air/fuel mixture and the exhaust gas exist together in the combustion chamber during the overlap interval, some of the intake fresh air/fuel mixture is discharged through the exhaust port by means of the inertia of the exhaust gases and some of the exhaust gases flows into the intake port, thus resulting in the degradation of the output efficiency of the engine together with the discharge of some of the unburnt gases.

Means to resolve this problem is proposed in the Japanese Utility Model Publication No. 93-9456 entitled as "Gas Supplying Control For A Two Cycle Engine". This discloses a moveable mask plate that is mounted between the intake valve and the valve seat in the intake port to close the exhaust valve opening. The moveable mask plate is to close the exhaust valve opening in the initial stage of the opening of the intake valve, and to open the opening of the intake valve. This prevents the exhaust gases from flowing backwards, but not the intake air/fuel mixture from being discharged via the exhaust port. Moreover, the device may be employed only in the two cycle engine. In addition, the moveable mask plate is operated by the rocker arm, and therefore a separate cam is required to operate the exhaust valve.

SUMMARY OF THE INVENTION

It is an object of the present invention to provide a system for controlling the flow of intake and exhaust gases in an internal combustion engine, which prevents the intake and exhaust gases from flowing backwards.

It is another object of the present invention to provide means for improving the output efficiency of an internal combustion engine and minimizing the discharge of the unburnt air/fuel mixture.

According to an embodiment of the present invention, a device for controlling the flow of intake and exhaust gases in an internal combustion engine comprises:

a cylinder head with a plurality of cylinders each forming combustion chamber for burning air/fuel mixture to produce a mechanical energy, the combustion chamber having an intake valve for receiving an air/fuel mixture and an exhaust valve for exhausting burnt gases;

a blocking means for isolating the side of the intake valve from the side of the exhaust valve so as to prevent a fresh air/fuel mixture and the burnt gases from interfering with each other in the overlap interval between the final stage of the exhaust stroke and the beginning stage of the intake stroke during which the intake and exhaust valves simultaneously maintain the opening state; and a cam shaft for driving the intake and exhaust valves and the blocking means.

The blocking means preferably comprises a cam mounted on the cam shaft, a cam follower for contacting the cam, a resilient push means for resiliently pushing the cam follower against the cam, a hinge projection jutting out from the cylinder head, a lever mounted on the hinge projection for performing swing motions with one end attached to the bottom of the cam follower, a mask plate connected to the other end of the lever for isolating the side of the intake valve from the side of the exhaust valve during the overlap interval according to the swing motions of the lever.

The resilient push means preferably comprises a connecting rod attached beneath the cam follower, a case fixed on the cylinder head for mounting the connecting rod, a first resilient member mounted between the cam follower and the top of the case to resiliently support the one end of the lever, and a second resilient member mounted between the bottom of the connecting rod and the bottom of the case to resiliently push the connecting rod and thus the cam follower, thereby resiliently pushing the working surface of the cam follower against the cam all the time. The working surface of the cam follower is rounded to properly fit the cam. In addition, the mask plate is shaped concave when viewed at the side of the exhaust valve. The mask plate is positioned near the exhaust port of the exhaust valve in the combustion chamber and to sufficiently block the side of the intake valve. The mask plate has an upper narrow connecting end inserted into a groove formed in the middle of the other end of the lever.

The present invention will now be described more specifically with reference to the drawings attached only by way of example.

DETAILED DESCRIPTION OF THE PREFERRED EMBODIMENTS

Figure 1:
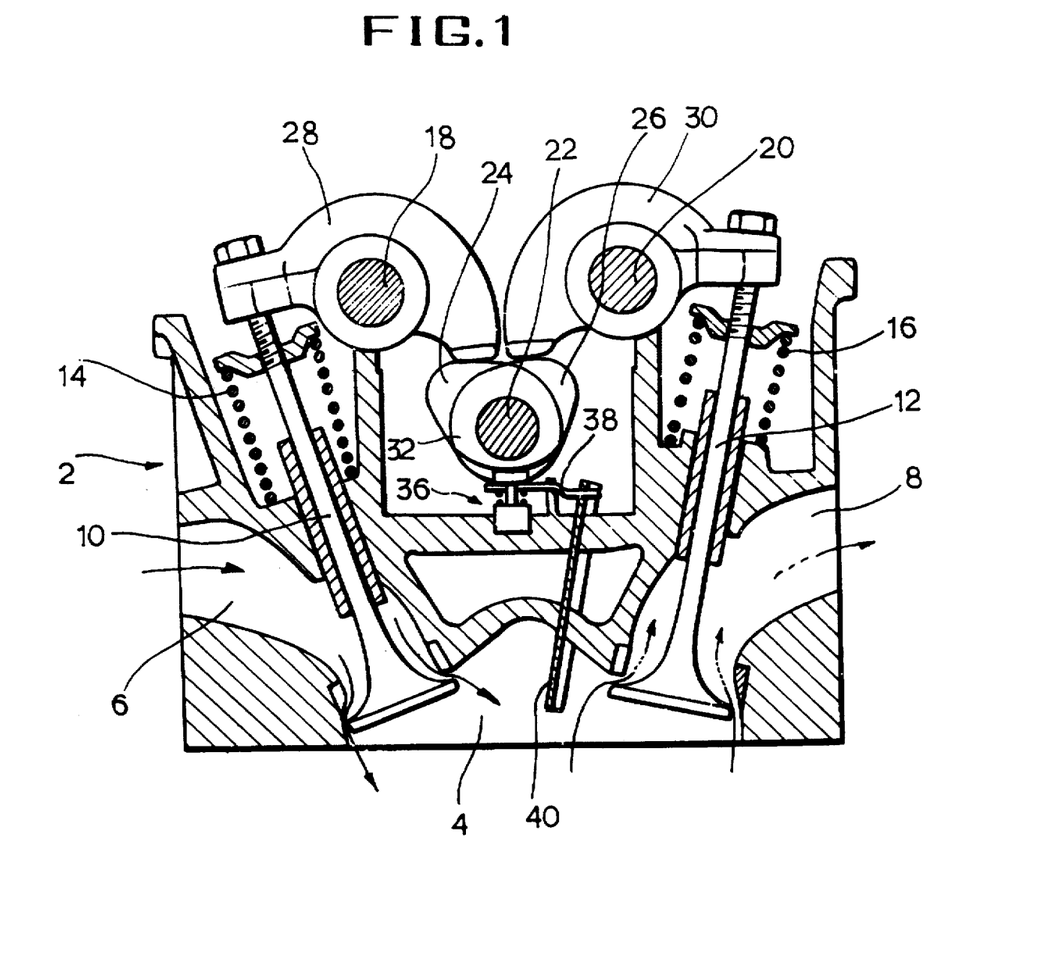
FIG. 1 is a cross sectional view of the inventive device for schematically illustrating the operation thereof.
Figure 2:
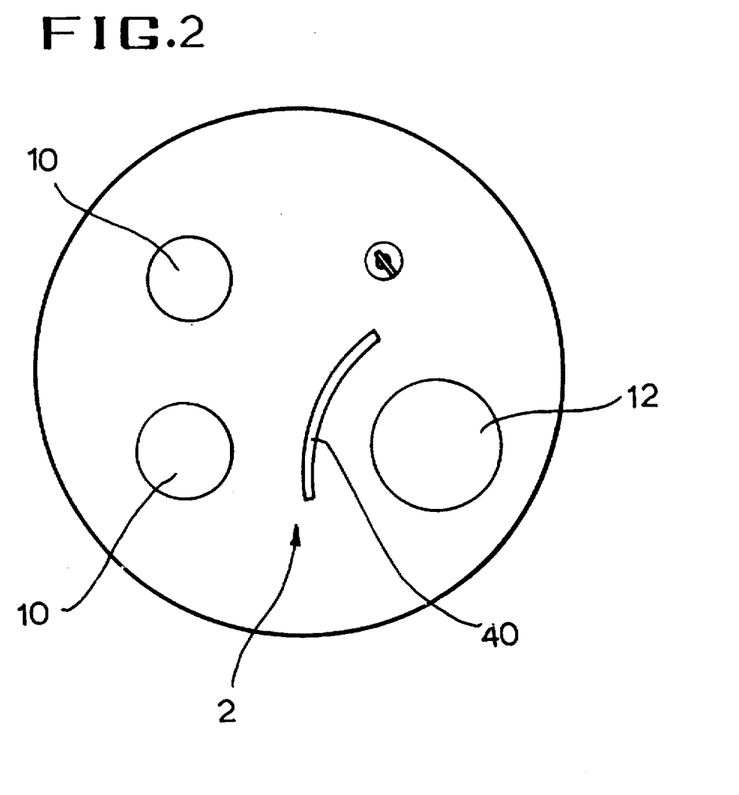
FIG. 2 is a schematic view for illustrating the upper inner surface of the combustion chamber with the inventive device.

Referring to FIG. 1, the lower middle part of the cylinder head 2 has a combustion chamber 4. Respectively provided in both sides of the combustion chamber 4 are an intake port 6 for taking in an air/fuel mixture and an exhaust port 8 for exhausting the burnt gases, which are respectively closed by an intake valve 10 and an exhaust valve 12. FIG. 2 shows a cylinder head 2 with two intake ports 6 and an exhaust port 8. The intake and exhaust ports 6 and 8 are normally closed respectively by means of the intake valve 10 and an exhaust valve 12 pushed by valve springs 14 and 16. When opening the intake or exhaust port 6 or 8, a rocker arm 28 or 30 pivots on a shaft 18 or 20 with one end connected to the stem of the intake or exhaust valve 10 or 12 and with the other end moved by the cam surface 24 or 26 of a cam mounted on a cam shaft 22.

Figure 3:
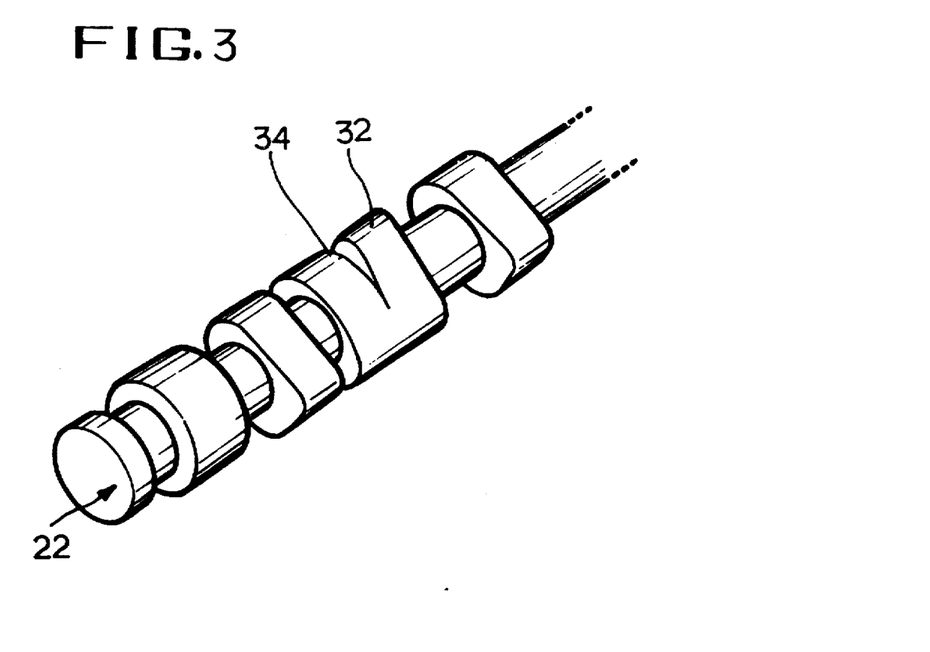
FIG. 3 is a perspective view of a cam shaft according an embodiment of the present invention.
Figure 4:
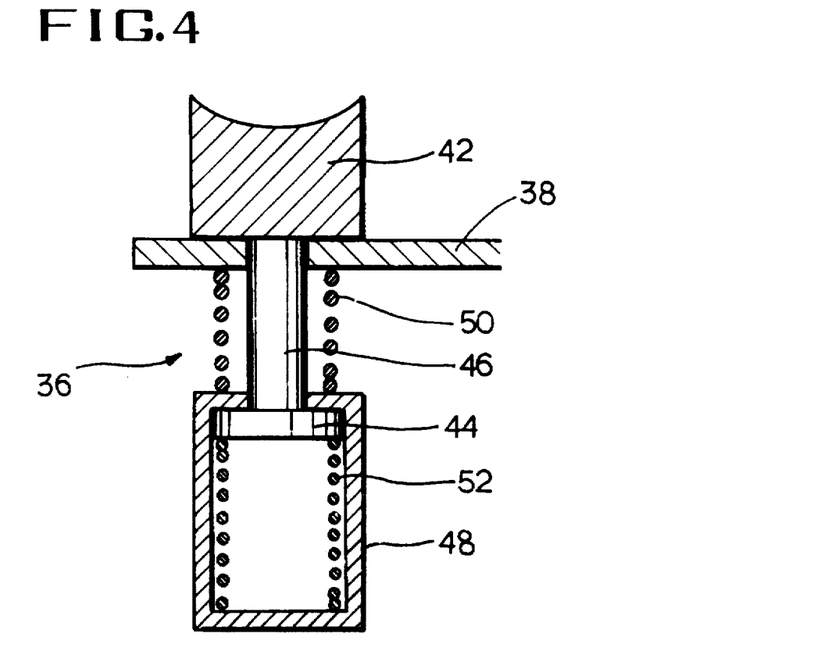
FIG. 4 is a cross sectional view of a resilient push part according to an embodiment of the present invention.

As shown in FIG. 3, provided on one side of an exhaust cam 32 is an additional cam 34 to operate an resilient push part 36, which includes a lever 38 pivotally mounted beside the exhaust valve 12. The lever 38 has one end connected to the resilient push part 36 and the other end to a mask plate 40 inserted into the combustion chamber 4. As the resilient push part moves along the cam surface of the additional cam 34, the lever 38 pivots to upwardly and downwardly move the mask plate 40. The resilient push part 36 includes a cam follower 42, a connecting rod 46 attached beneath the cam follower 42, a large diameter part 44 mounted on the lower end of the connecting rod, and a case 48 for mounting the large diameter part 44. The case 48 is embedded into the cylinder head 2 by more than half of its length. A first resilient member 50 is mounted between the cam follower 42 and the top of the case 48 to resiliently support the one end of the lever 38. In addition, a second resilient member 52 is mounted between the large diameter part 44 of the connecting rod 46 and the bottom of the case 48 to resiliently push the connecting rod 46 and thus the cam follower 42, so that the working surface of the cam follower 42 may resiliently contact the additional cam all the time. The working surface of the cam follower 42 is rounded to properly fit the additional cam 34. When the additional cam 34 is rotated, the cam follower 42 is raised with the help of the first resilient member 50 and lowered along the cam surface of the cam 34, thus pivoting the lever 38. The second resilient member 52 is to buffer the contact of the cam follower 42 with the cam surface of the additional cam 34.

Figure 5:
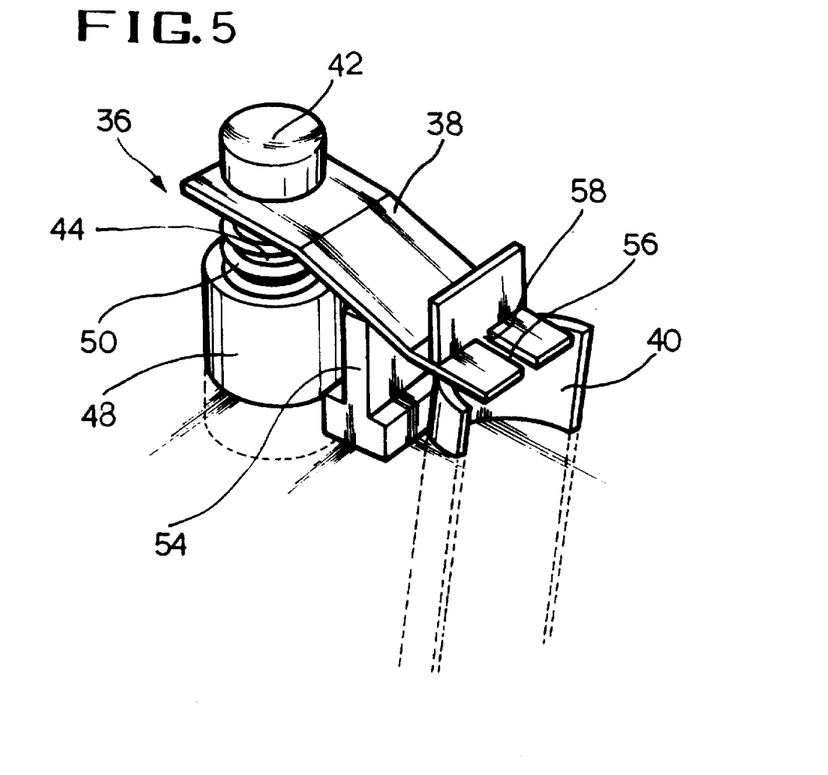
FIG. 5 is a perspective view for illustrating a device for controlling the flow of intake and exhaust gases mounted in an internal combustion engine.

The lever 38 is made of a strip, which is bent in the middle part so as to incline the mask plate 40 at a given angle. The middle portion of the lever 38 is naturally supported on a hinge projection 54 jutting out from the cylinder head 2. This makes the mask plate 40 be freely raised and lowered in the inclined state. The mask plate 40 connected to the other end of the lever 38 is shaped concave when viewed at the side of the exhaust port 8, and reciprocally inserted through the cylinder head 2 into the combustion chamber 3. The concave shape of the mask plate 40 is to effectively prevent the exhaust gases from reversely flowing toward the intake port 6 so as to interfere with the intake air. As shown in FIG. 2, the mask plate 40 is positioned near the exhaust port 8 in the combustion chamber 2 and to sufficiently block the side of the intake port 6. The mask plate 40 has an upper narrow connecting end 58 inserted into a groove 56 formed in the middle of the other end of the lever 38, as shown in FIG. 5.

Figure 6:
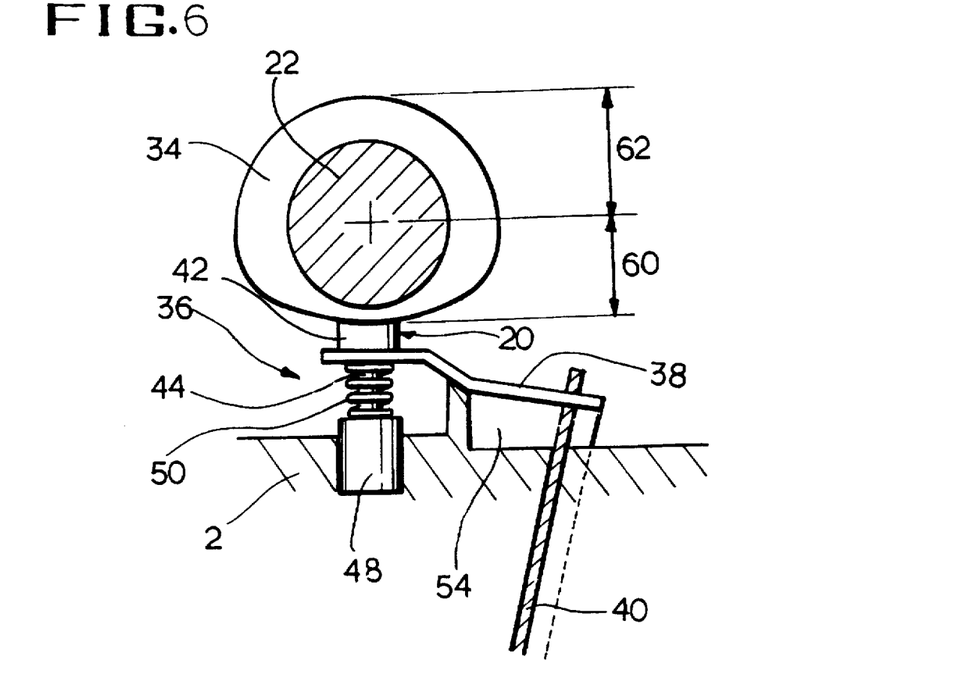
FIGS. 6 and 7 is a schematic side view for illustrating the operation of the inventive device.
Figure 7:
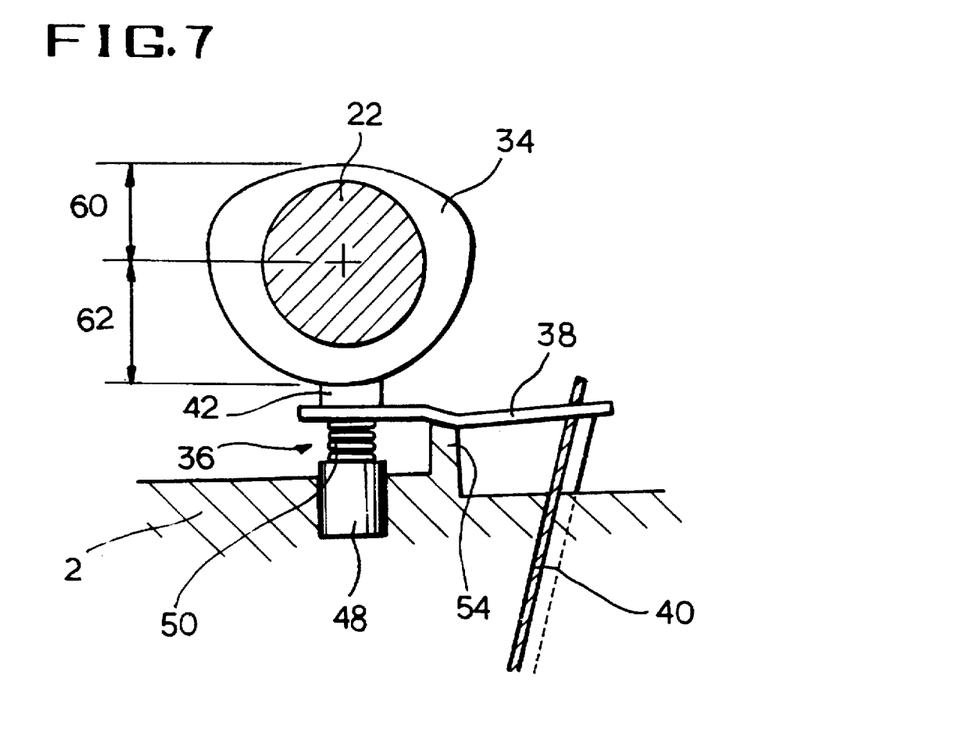

The operation of the inventive device is described with reference to FIGS. 6 and 7. There is shown the mask plate 40 lowered in FIG. 6, which represents the overlap interval for the intake and exhaust valves 10 and 12 to be simultaneously opened. In this case, the small diameter portion 60 of the additional cam 34 contacts the cam follower 42 to raise so as to lower the other end of the lever 38 and thus the mask plate 40. Then, the lower end part of the mask plate 40 blocks the side of the intake valve 12 of the combustion chamber 2, as shown in FIG. 2, preventing the intake air/fuel mixture of the intake port 6 from flowing toward the side of the exhaust port 8. Of course, the exhaust gases are also prevented by the mask plate 40 from flowing toward the intake port 6. FIG. 7 represents the operational stages other than the overlap interval, where the large diameter portion 62 of the additional cam 34 contacts the cam follower 42 to lower so as to raise the other end of the lever 38 and thus the mask plate 40. Then, the mask plate 40 retreats into the cylinder head 2 to not interfere with the gas flow in the combustion chamber, thereby carrying out the normal operation.

Figure 8:
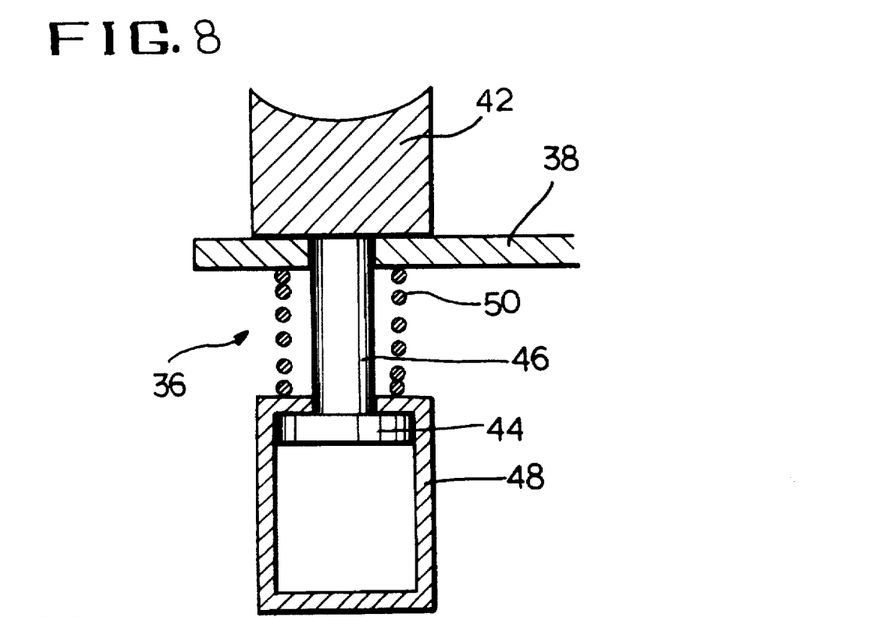
FIG. 8 is a cross sectional view of a resilient push part according to another embodiment of the present invention.
Figure 9:
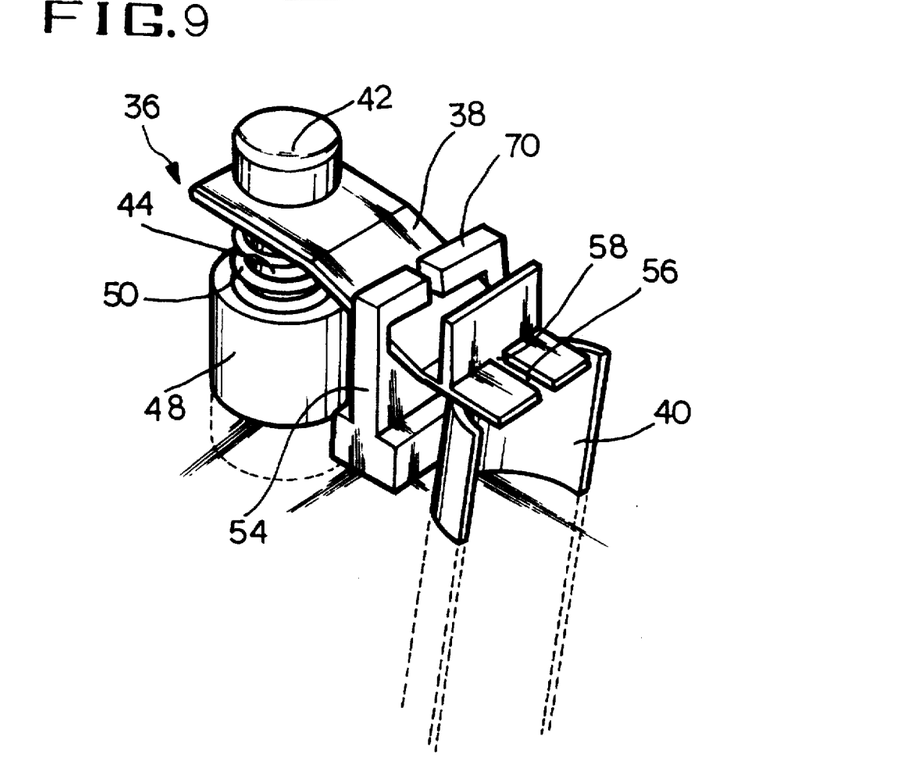
FIG. 9 is a perspective view for illustrating a hinge projection according to another embodiment of the present invention.

The cam surface of the small diameter portion 60 of the additional cam 34 is shaped so as to correctly lower the mask plate 40 for the overlap interval during which the intake and exhaust valves 10 and 12 are simultaneously opened. Additionally, the boundary portion between the small diameter portion 60 of the cam 34 and the large diameter portion 62 should be shaped so as not to cause surging when the mask plate 40 does the transfer motion between the raising motion and the lowering motion. FIG. 8 shows a cross sectional view of another resilient push part without the second resilient member 52, which does the same work as that with the second resilient member. FIG. 9 shows another hinge projection 54 including a loop shaped portion 70 at the upper end for receiving the lever 38. However, the lever 38 is not mounted in a fixed hinge manner, but moveable in the loop shaped portion 70 for the mask plate 40 to be smoothly raised and lowered.

What is claimed is:

1. A device for controlling the flow of intake and exhaust gases in an internal combustion engine, comprising:

a cylinder head with a plurality of cylinders each forming combustion chamber for burning air/fuel mixture to produce a mechanical energy, said combustion chamber having an intake valve for receiving an air/fuel mixture and an exhaust valve for exhausting burnt gases;

a blocking means for isolating the side of said intake valve from the side of said exhaust valve so as to prevent a fresh air/fuel mixture and said burnt gases from interfering with each other in the overlap interval between the final stage of the exhaust stroke and the beginning stage of the intake stroke during which said intake and exhaust valves simultaneously maintain the opening state; and a cam shaft for driving said intake and exhaust valves and said blocking means.

2. A device as defined in claim 1, wherein said blocking means comprises a cam mounted on said cam shaft, a cam follower foe contacting said cam, a resilient push means for resiliently pushing said cam follower against said cam, a hinge projection jutting out from said cylinder head, a lever mounted on said hinge projection for performing swing motions with one end attached to the bottom of said cam follower, a mask plate connected to the other end of said lever for isolating the side of said intake valve from the side of said exhaust valve during said overlap interval according to the swing motions of said lever.

3. A device as defined in claim 2, wherein said resilient push means comprises a connecting rod attached beneath the cam follower, a case fixed on said cylinder head for mounting said connecting rod, a first resilient member mounted between said cam follower and the top of said case to resiliently support the one end of said lever, and a second resilient member mounted between the bottom of said connecting rod and the bottom of said case to resiliently push said connecting rod and thus said cam follower, thereby resiliently pushing the working surface of said cam follower against said cam all the time.

4. A device as defined in claim 3, wherein the working surface of said cam follower is rounded to properly fit said cam.

5. A device as defined in claim 2, wherein said resilient push means comprises a connecting rod attached beneath the cam follower, a case fixed on said cylinder head for mounting said connecting rod, and a first resilient member mounted between said cam follower and the top of said case to resiliently support the one end of said lever, thereby resiliently pushing the working surface of said cam follower against said cam all the time.

6. A device as defined in claim 2, wherein the middle portion of said lever is naturally supported on said hinge projection.

7. A device as defined in claim 2, wherein said hinge projection includes a loop shaped portion at the upper end for receiving said lever.

8. A device as defined in claim 2, wherein said mask plate is shaped concave when viewed from the side of said exhaust valve.

9. A device as defined in claim 2 or 8, wherein said mask plate is positioned near the exhaust port of said exhaust valve in said combustion chamber and to sufficiently block the side of the intake valve.

10. A device as defined in claim 2, wherein said mask plate has an upper narrow connecting end inserted into a groove formed in the middle of the other end of said lever.

* * * * *

UNITED STATES PATENT AND TRADEMARK OFFICE
CERTIFICATE OF CORRECTION

PATENT NO. : 5,546,898
DATED : August 20, 1996
INVENTOR(S) : Yoonsuk KIM

It is certified that error appears in the above-indentified patent and that said Letters Patent is hereby corrected as shown below:

IN THE CLAIMS:

claim 2, column 5, line 5, change "foe" to read --for--.

Signed and Sealed this

Tenth Day of December, 1996

*Attest:*

BRUCE LEHMAN

*Attesting Officer*   *Commissioner of Patents and Trademarks*